(12) United States Patent
Winters et al.

(10) Patent No.: US 11,263,650 B2
(45) Date of Patent: Mar. 1, 2022

(54) PROCESS AND SYSTEM TO CATEGORIZE, EVALUATE AND OPTIMIZE A CUSTOMER EXPERIENCE

(71) Applicant: [24]7.ai, Inc., San Jose, CA (US)

(72) Inventors: Gilbert Winters, Brisbane (AU); Joachim Elshof, Richmond (AU); Alex Shmelev, Corte Madera, CA (US)

(73) Assignee: [24]7.ai, Inc., San Jose, CA (US)

( * ) Notice: Subject to any disclaimer, the term of this patent is extended or adjusted under 35 U.S.C. 154(b) by 594 days.

(21) Appl. No.: 15/495,797

(22) Filed: Apr. 24, 2017

(65) Prior Publication Data
US 2017/0308917 A1  Oct. 26, 2017

Related U.S. Application Data

(60) Provisional application No. 62/327,318, filed on Apr. 25, 2016.

(51) Int. Cl.
| | | |
|---|---|---|
| *G06Q 30/02* | (2012.01) | |
| *G06Q 10/06* | (2012.01) | |
| *G06Q 30/00* | (2012.01) | |
| *H04L 67/50* | (2022.01) | |

(52) U.S. Cl.
CPC ... *G06Q 30/0203* (2013.01); *G06Q 10/06375* (2013.01); *G06Q 30/016* (2013.01); *H04L 67/22* (2013.01)

(58) Field of Classification Search
CPC ......... G06Q 30/0203; G06Q 10/06375; G06Q 30/016; G06Q 30/0201; H04L 67/201
See application file for complete search history.

(56) References Cited

U.S. PATENT DOCUMENTS

| | | | | |
|---|---|---|---|---|
| 6,477,580 B1 * | 11/2002 | Bowman-Amuah | ..... | G06F 9/54 709/231 |
| 7,200,525 B1 * | 4/2007 | Williams | .............. | G06F 11/008 702/185 |
| 2007/0112714 A1 * | 5/2007 | Fairweather | ....... | G06K 13/0825 706/46 |

(Continued)

*Primary Examiner* — Rutao Wu
*Assistant Examiner* — Stephen S Swartz
(74) *Attorney, Agent, or Firm* — Perkins Coie LLP; Michael Glenn

(57) ABSTRACT

A system and a process using that system is provided for creating, analyzing and optimizing a customer journey. The process includes real-time creation and continuing analysis of an "Event Sequence Index," (ESI) corresponding to a time-stamped labeled set of data points representing cumulative events along the customer journey. The data points are further associated with channels, which are modes of interaction between the customer and the organization, and mapped into a linked directed graph which is amenable to analysis through a recursive pattern matching method, such as a non-deterministic finite automaton, employing DQL (Distributed Query Language). Selected portions of these graphs can be identified, either statistically or causally, as signatures of highly satisfactory or unsatisfactory outcomes and may be stored in memory as real-time predictors of the course of a present customer experience and to suggest statistically feasible and effective interventions. Concurrently, the signatures may be used as feedback to an organization for improvements in customer relations.

27 Claims, 10 Drawing Sheets

(56) References Cited

U.S. PATENT DOCUMENTS

| | | | |
|---|---|---|---|
| 2009/0171704 A1* | 7/2009 | Bobak | G06Q 10/103 |
| | | | 705/7.12 |
| 2011/0145230 A1* | 6/2011 | Eskey | G06Q 30/02 |
| | | | 707/728 |
| 2012/0054095 A1* | 3/2012 | Lesandro | G06Q 20/10 |
| | | | 705/39 |
| 2012/0066206 A1* | 3/2012 | Chappell | G06F 16/24532 |
| | | | 707/713 |
| 2012/0137367 A1* | 5/2012 | Dupont | G06F 21/00 |
| | | | 726/25 |
| 2015/0229729 A1* | 8/2015 | van der Heijden | G06Q 30/0246 |
| | | | 705/14.45 |
| 2015/0262107 A1* | 9/2015 | Singh | G06Q 10/06393 |
| | | | 705/7.39 |
| 2015/0350440 A1* | 12/2015 | Steiner | H04M 3/5232 |
| | | | 379/266.01 |
| 2016/0104079 A1* | 4/2016 | Greenberg | G06F 3/04845 |
| | | | 705/5 |
| 2017/0006135 A1* | 1/2017 | Siebel | G06F 9/5072 |

* cited by examiner

PROCESS AND SYSTEM TO CATEGORIZE, EVALUATE AND OPTIMIZE A CUSTOMER EXPERIENCE

RELATED APPLICATIONS

This application claims prior to co-pending U.S. Provisional Patent Application Ser. No. 62/327,318 filed on Apr. 25, 2016; the contents of which are incorporated herein by reference in their entirety.

BACKGROUND

1. Technical Field

This disclosure relates to a customer experience. In particular it relates to a process and system to categorize and evaluate such an experience subsequent to its completion or to optimize it as it is occurring.

2. Description

Organizations that interact with the public, such as, but not limited to, businesses and governmental agencies and other service providers, hereinafter referred to collectively as "organizations," strive to create an environment in which such interactions are both pleasant and mutually satisfying. Many such interactions are initiated when an individual or company, to include both current and potential customers, hereinafter referred to as a "customer," engages with, or is engaged by the organization, either through personal contact (e.g., customer walks into store), or through external communication devices or user interfaces, such as a telephones, mobile phones, kiosks, emails, mail, SMSs, faxes, or computer websites, the mode of engagement with the customer hereinafter being referred to as a "channel." The organization supporting this channel and the communication process using the channel attempts to design a mode of interaction with the customer that leads to an efficient and effective provision of the service or product that the customer is seeking or that the organization is selling. The progress of this communication process, combined with the support and service the organization provides to the customer as well as the performance and ease of use of the actual products and services is hereinafter referred to as a "customer experience."

Due to the large number of customers attempting to access such services, they are often provided by means that are automated or otherwise depersonalized. For example, portions of the communication may involve the customer engaging in an impersonal dialog with an interactive voice response (IVR) system. Alternatively, the customer may be asked to select and enter a series of numbers through a user interface to indicate in detail the nature of a request, or the customer may be placed in contact with a series of different responders, with delays inevitably associated with each transfer, as the nature of the request becomes more complicated. In order for the organization involved to be able to refer to this complex series of interactions between itself and the customer and if necessary analyze it, it has become useful for the totality of steps comprising the customer experience to be encoded as a set of data points, broadly referred to as the "journey" or the customer journey.

Needless to say, there may be times during this process when the customer becomes irritated, discouraged, or tempted to disengage from the process entirely. Perhaps even worse, the customer may not be able to fully complete the process or may complete the process and not obtain the product or service that was initially desired, or more commonly, complete the process but at unnecessary effort to the customer and excessive cost to the organization. Equally undesirable is when the customer goes to another enterprise altogether, seeking a better result there. This is called "churn," and it is definitely to be avoided.

When such occasions occur, the "customer experience" may be said to have progressed along a sub-optimal path or even an anomalous path. In hindsight, the organization involved would most likely desire to better understand the nature of that sub-optimal path and why it occurred in order to prevent it from re-occurring for customers. Even more desirable, but not presently possible, would be an ability for the organization to act preemptively in response to a set of triggering conditions indicating that a current experience is about to enter such a sub-optimal path. Under such conditions, if such an organizational ability existed, the organization might be able to change the path while the customer is still pleasantly engaged and the desired outcome is still visible on the horizon.

It is well-known that the existing level of concern for managing a customer experience is important to maintaining customers and reducing or limiting churn. Current methods adopted to address customer churn are time consuming, often not specific enough, sometimes too focused on particular types of experiences or on portions of the experiential process and, more importantly, do not provide the systems and processes proper analysis tools. As such, there is a need for a system and process by which such an optimized customer experience can be produced and managed, even in real-time if so desired.

SUMMARY

The features of this disclosure listed below will be achieved by a system and the use of that system to implement a computer-implemented method. For clarity of the following description, several terms and phrases will now be defined and hereinafter used consistently in terms of their present definitions:

"Customer Experience," is the actual process that defines the nature of a customer's continuing engagement with some "organization" (also, the "company") as a result of which the customer is seeking some desired conclusion.

"Customer Relationship Master Record" includes one or more files created by the organization in which is stored all transactions that have occurred between a customer and the organization. It is understood in what follows that the organization may provide a linked or otherwise networked grid of computer nodes across which the various customer files may be distributed. Thus, a multiplicity of customers may simultaneously be engaged with the organization through access to the various nodes.

"Customer Journey" is the data representation of all the information available for uniquely describing a given customer's interactions with the organization. It contains slow-moving changes to the Customer Relationship Master Record, such as customer name, address changes, service plan changes, and product additions/deletions. The Customer Journey also contains all rapidly occurring changes resulting from events that occur during the customer experience, such as the many different channels accessed by the customer, the times at which all applicable events occurred, currency amounts involved, etc. In short all descriptors required to uniquely describe the customer's interaction with the organization. Efficient analysis of a customer journey is dependent on a correspondingly efficient representation of the data format in which the journey is cast. Once created and analyzed, the journey and its analysis can be made available to various agents/representatives within the organization for multiple uses, some of which will be the subject of this disclosure.

"Event Sequence Index," (ESI) is a data file created from the customer journey by re-ordering the data characterizing all events occurring along that journey into a time-stamped ordered chain that is uniquely identified by the customer's name, customer's account number or the like. The ordered chain comprises a linked set of channels and events occurring along the channels. Each channel defines and represents a possible mode of interaction between the customer and the organization, such as an "in-store" channel if the customer makes a purchase in an actual "bricks-and-mortar" store; a web-based internet channel if the customer makes an online purchase, and the like. Events occurring along a channel might include a sequence of interactive voice response (IVR) events along a telephone channel, net promoter score (NPS) events if the customer is asked to rate some procedure, or the like.

"Customer Experience Data Structure" (CEDS) is a representation of the event sequence index so that each unique event is represented as a discrete, recognizable symbol, somewhat analogous to the genetic encoding of genes along a strand of DNA, but requiring many more than the four letters C, A, T, G, representing the four base nucleotides Cytosine, Adenine, Thymine, and Guanine. This form of symbolic encoding or representation compresses and combines the data in the ESI in a way that allows an efficient and rapid search for patterns in the given ESI for the purpose of comparing and matching the patterns to patterns in other already analyzed customer journeys. The discovery of such matching patterns is considered predictive (statistically or deterministically) of similar outcomes and, given the real-time nature of the matching process, enables an intervention between the organization and the customer to re-direct the ongoing customer experience in a more positive manner. It is an aspect of the present disclosure to discover patterns within a given ESI for matching with patterns in other ESI's that are known to lead to outcomes deemed undesirable and to be avoided or patterns that are deemed desirable and to be encouraged. More generally, the discovery or creation of statistical ensembles of patterns that are predictive of unsatisfactory outcomes for a customer enables analysts and customer-service representatives of the company to draw more general conclusions regarding the relationship between company services and subsequent customer behaviors and enable the company to pro-actively improve its services rather than just reacting palliatively to specific customer journeys.

"DQL (Distributed Query Language)" is a declarative query language used to access information in a database of time-series events. DQL can be considered a DSL, a Domain Specific Language. As shown in two examples to be discussed below, DQL can be expressed using JSON (JavaScript Object Notation) and includes:

1. Clauses: constituent components making up portions of a query.
2. Predicates: specifying conditions that can be evaluated using binary logic.
3. Patterns: descriptions of ordered or non-ordered sequences of events separated by time.
4. Operations: a set of calculations to be performed on events matching the given patterns The structure of DQL makes it eminently suitable for evaluating ESI's and for manipulating the data represented in ESI's so that the data is accessible to other automated systems. In the examples to be discussed below, DQL may be used to query an artificially constructed ESI to detect the presence of specific patterns. Moreover, the operations allow the DQL syntax to be more expressive than a binary answer of "did a customer match pattern X" to answer more complex questions, such as, "what is the time-series trend volume of customers doing X?" or "what is common about customers who do X compared to the general population"? The operations may allow other system components to access richer result sets for further analysis.

"Directed Graph" is a particular mathematical model of a series of events that comprise the ESI form of a customer journey. The directed graph is a linked set of nodes, where the nodes represents time-stamped events and the links are the elapsed times between the events. Each node/event is indexed (using letters or symbols) by all of the relevant information that defines the event, such as the channel through which the customer interacts with the organization is represented. The graph is "directed" in the sense of a time-ordering implied by the elapsed time (the length of the links) between the nodes and the direction of time flow from one event to the next. These graphs are created, stored, accessed and analyzed within the system disclosed herein while a journey is actually occurring.

"Pattern-Matching" is a computational process that here, specifically, refers to a computerized recursive algorithmic process by which the presence of certain defined patterns in a given ESI are searched for in sets of other ESI's or portions of other ESI's. In the present disclosure, these patterns are segments of the linked directed graphs that represent a particular sequence of identifiable events in an ESI. The linked directed graphs may represent specific sequences of events with specific elapsed times between the events or sequences of events with or without other events occurring between the events or any of a multiplicity of combinations that may occur between a customer and an organization. The capability of searching for particular patterns in a timely and accurate fashion results from events being expressed in a format that can be searched using a pattern-matching algorithm expressed in DQL (see above for a further definition of DQL). The pattern-matching algorithm can be a non-deterministic finite automaton (NDFA) of a type that is well known to those skilled in the art. More specifically, it can be the subclass of algorithms including RegEx or RegExOne, which have the virtue of being able to search for patterns formed of arbitrary symbols. This symbol-searching capability is particularly appropriate for pattern searching and pattern-matching processes applied to the linked directed graphs representing a customer journey since the nodes in a directed graph that represents a journey may be expressed by complex sets of symbols.

"Signature File" is a computer accessible file containing representations (i.e., linked directed graphs) of portions of ESI's that are known to have led to unacceptable or unsatisfactory customer journeys (or of successful ones, if required) as determined by prior organizational analysis. The signature itself may be a small patterned segment of the ESI whose pattern is recognizable and deemed predictive of a known anomalous and typically, but not always, an undesirable outcome. The predictive nature of a signature may be determined by statistical or deterministic (causal) analysis of event sequences done by customer relations analysts. If a signature (pattern segment) can be matched using the pattern-matching processes described herein with a portion of an ongoing customer journey. The match may be interpreted as being predictive that the ongoing customer journey may likewise have the anomalous outcome.

In an aspect of this disclosure, a pattern match between an ongoing ESI and a signature may be construed (by an observing agent or an autonomous embedded algorithm) as a signal that an intervention is to be made in the ongoing customer journey. The nature of the particular intervention that is considered to be most appropriate may itself be determined by statistical analysis of a sufficiently large group of the unsatisfactory journeys or a process of machine learning or predictive modeling. It is noted that satisfactory journeys are also worthy of analysis if it is desired to promote optimal paths or gain additional insights into customer behaviors, but the assumption is that most journeys may conclude in a satisfactory manner so that the significant (anomalous) journeys are those that do not.

"Anomaly" as used herein, is a general term for a customer journey that did not, or will likely not, proceed in a desirable manner. Under more limited circumstances, an anomaly may refer to a customer journey that proceeds in such a particularly satisfactory manner that it, too, is worthy of note. It is an aspect of this disclosure that anomalies of the undesirable sort can be identified before they have reached their undesirable end by matching their unfolding ESI to signature portions of other ESI's that have been stored in a signature file. With these definitions in mind:

A first feature of the present disclosure is to provide an accurate, reliable, time-conserving and cost-effective process and system for creating, evaluating, categorizing and optimizing a customer experience in a manner that is predictive of its outcome and may be actionable both in real-time and retrospectively.

A second feature of the present disclosure is to obtain the capability, on a real-time basis, to avert an unsatisfactory outcome of an ongoing customer experience, and, on a longer term, retrospective-basis, make the results of a customer experience analysis available to customer service agents and organization analysts as needed. It is to be noted that the creation of such a customer experience and its analysis brings with it a host of long-term capabilities for the organization involved. The customer experience analysis can be used for the training of agents that typically are involved with the customer in such experiences. Moreover, the customer experience analysis can be used to improve conflict resolution between the customer and the organization. The customer experience analysis can promote successful self-service for the customer by enabling successful outcomes requiring minimal interactions. The customer experience analysis can be time conserving by shortening the time-to-completion of a customer engagement. The customer experience analysis can improve the propensity of the customer to accept the product and service offerings of the organization. The customer experience analysis can reduce the necessity of a customer to lodge formal complaints. The customer experience analysis can improve incentive structures for agents themselves. The customer experience analysis can improve planning for dealing with product shortfalls which quite often lead to customer complaints. The customer experience analysis can help to assess the effectiveness of low(er) cost channels of interaction. The customer experience analysis can support methods of fraud detection. The customer experience analysis can support customer advocacy for the organization as a result of a successful outcome for the customer.

It is expected that those involved with customer experiences and skilled in the art of their analysis will understand that among the improvements to be gained from the second feature of the present disclosure is to provide an accurate, reliable and cost-effective process and system of sufficient speed to enable the assessment of the progress of an ongoing customer experience, while said customer is currently in communication with an organization by any of a multiplicity of communication "channels" including, but not limited to, either in-person (person-to-person) contact, or, more generally some form of remote telemetry, including wired telephone, wireless (mobile) telephone, IVR (interactive voice response), mail, email, faxes, SMS messages, kiosks, computer accessed website or the internet.

A third feature of the present disclosure is to provide such an accurate, reliable and cost-effective process and system for assessing a customer journey by creating a data-representation, termed an "event sequence index, (ESI)" comprising certain identifiable characteristics of the set of interactions between the customer and the organization being communicated with by the customer, wherein such interactions are represented by data points that include multiplicities of data that may include the time the interaction occurred, the channel in which the interaction occurred, the particular process within that channel at which the interaction occurred, and the outcome of that particular process.

A fourth feature of the present disclosure is to provide such an accurate, reliable, and cost-effective process and system for assessing the progress of an ongoing customer experience by visualizing that experience in terms of a linked, directed graphical structure, wherein that linked directed graphical structure corresponds directly with the set of data points comprising the event sequence index of the previous object.

A fifth feature of the present disclosure is to provide an accurate, reliable and cost-effective process and system for assessing the progress of an ongoing customer experience formed as a linked directed graph, and determining a correspondence (a pattern-match) between portions of that linked directed graph or data points corresponding to those portions and portions of known characterized results of previous customer experiences and their corresponding linked directed graphs.

A sixth feature of the present disclosure is to provide an accurate, timely, reliable, and cost-effective process, and system for assessing the progress of an ongoing customer experience by expressing its ESI as a linked, directed graph, or any corresponding data-representation that may faithfully represent an event sequence index. The structural form of the event sequence index is to be searchable for patterns, such as a form amenable to a rapid, accurate and efficient search by DQL, thereby enabling comparisons to be made with other data structures, specifically a linked directed graph, corresponding to other customer experiences, and thereby to be analyzed and categorized in real-time by comparison to other such forms.

A seventh feature of the present disclosure is to provide an, accurate, reliable and cost-effective process and system for assessing the progress of an ongoing customer experience and the potential impact of intervening in that experience if certain triggering events, such as a pattern-match to a signature, occur.

An eighth feature of the present disclosure is to provide an, accurate, reliable and cost-effective process and system for intervening in an ongoing customer experience when at least one triggering event is identified by matching to a signature event sequence and thereupon reconfiguring said customer experience so that it continues along a varied path from the point of the triggering event.

A ninth feature of the present disclosure is to use the characterized event-sequence indexes of customer experiences to create a frequency analysis of their outcomes based on patterns encoded within those event sequence indexes either in their data file format or their linked directed graphs.

A tenth feature of the present disclosure is to categorize an event sequence in terms of its endpoint result to the customer and to the organization.

An eleventh feature of the present disclosure is to determine events subsequent to the completion of a customer experience to determine the reliability and predictive value of an event sequence.

A twelfth feature of the present disclosure is to create a frequency analysis of event sequences and to use that frequency analysis to determine the predictive nature of event signatures and best responses to avoid unsatisfactory outcomes or enhance satisfactory ones.

It has been said that the difference between "data mining" or "data analytics" and "data science" is that data mining/analytics is the search for the answer to specific questions by aggregating and studying particular sets of data, while data science is the use of a particular set of data to suggest what questions need to be asked. Thus, by correlating many sets of individual customer experiences and observing similarities in them in terms of patterns, questions may be suggested as to "why" (i.e., what are the predictors) certain anomalous experiences are occurring and what actions tend to be taken by customers subsequent to particular types of customer experiences. This then is the connection between data analytics and behavioral analytics leading, in turn, to the ability of an organization to preemptively address emerging problems. Finally, the statistical analyses of customer experiences can reveal certain types of issues that are persistent at the customer level and that may be correlated with underlying structural and functional issues in the organization itself. Correcting underlying issues or making the organization aware of their existence can further ameliorate the corresponding unsatisfactory customer experiences.

A thirteenth feature of the present disclosure is to produce and maintain a statistical database of correlations between customer experiences, customer behaviors that are correlated with those experiences and subsequent actions taken by customers associated with those behaviors that may be predictable.

A fourteenth feature of the present disclosure is to correlate persistent/recurring types of customer experiences with underlying organizational issues and to suggest mechanisms by which these underlying issues may be addressed so that unsatisfactory customer experiences can be dealt with preemptively.

The following will provide a brief, schematic description of an illustrative system, its components and its method of operation to produce a successful customer experience and to learn from results produced by the system. Referring first to schematic FIG. 1, the system is illustrated as having its components disposed around a circular path for ease of describing the steps of the process in terms of a clockwise ordering (equivalently, a flow chart notation can also be used as shown in FIG. 8).

The system and process to be illustrated here is to be understood as occurring in a general, schematic form, relatively independent of the nature of a particular organization or the product/service it provides; but in an actual customer experience, in which the customer is engaging with a specific organization, the system may be structured and equipped with appropriate hardware and software tailored to that specific organization. In each case, however, there may be a mode or modes of interaction with the organization that is denoted a "channel," which is a particular mode of interaction between the customer and the organization. Thus, the customer may create and engage in an ongoing customer experience at a "bricks-and-mortar" store (as opposed to a purely online service provider), which would thereby require and create a store-based channel. The customer may subsequently re-commence the same experience at home, now using a land-line or mobile telephone or a computer website, thereby extending the experience along the telephone or website channel. The customer may then return to the store, activating the store channel yet again, all the while still being engaged in the same customer experience.

It is not unusual for customer experiences to be episodic in nature, where each episode may include all the actions taken by the customer in order to achieve a particular goal using a specific channel, for example, to make a purchase at a store operated by the organization of interest.

At some subsequent time, the same customer may engage with the same organization, using a different channel, to achieve some new purpose. For example, the customer may desire to alter a service plan or activate a newly issued credit card, either of which would extend the customer experience by adding a new episode. However, the customer experience is considered as a single cumulative file, stored in the customer relationship master record, labeled by the customer's identity and beginning at the point in time where the customer first interacted with the organization. The extensive nature of such a file, the number and diversity of its entries, and the multiplicity of symbols used to create a uniquely identifiable journey may use an efficient method of representing the data and searching the data so that the objects of this disclosure can be met.

Referring again to FIG. 1, at the top (12:00 position) of the path is a customer (10), who is currently engaged in an evolving customer experience (15) with an organization ("company") (40) using an exemplary channel as the mode of interaction. For simplicity, and by way of example, the channel can be assumed to be a telephonic channel accessed by the customer through his home telephone system. Such a channel can support an IVR (interactive voice response) system, which does not require a human presence. It can typically also support an interaction with a customer service representative, who is a human agent. The interaction between the customer and the IVR capabilities of the system are largely automated, whereas the interaction with a customer service representative is subject to the intelligent responses of that agent. However, as all of these interactions are occurring as customer experiences (15), there is an ongoing creation of a data file through data acquisition (20) to uniquely represent the sequence of events in a form that can be searched for patterns (30), typically as a linked directed graph. The creation of this data file (linked directed graph), its analysis by a particular searching and pattern-matching algorithm, its comparison to other data files in order to discover pattern matches with "signatures", the determination of actions that can be taken as a result of the searches and matches found or not found and the actual actions taken, that is the subject of this disclosure.

In one embodiment, an assumption may be made that the customer has just completed entry N of sequence of responses to N−1 previous instructions or prompts whose form and content may depend on the nature of the channel and the objective of the customer. The data acquisition module/service is typically provided and maintained by the company (20) and is capable of interacting with the customer by accepting responses (inputs) from the customer as a result of instructions from the module. The data acquisition service (20) might have previously received N−1 responses from the customer and has now received customer entry N. Each customer response to the data acquisition service as well as each response from the data acquisition service to the customer generates a distinct indexed output (25), which is typically an addition of a corresponding node and link to a linked directed graph (to be illustrated in FIG. 3) that is stored in memory in a format compatible with a pattern-matching algorithm employing DQL (Distributed Query Language). Several examples of this process are described with reference to FIGS. 6 and 7 below.

A data sequence generated by the interaction with the customer and created in a linked directed graph form by the data acquisition service (20) may then be directed to a data processing service (30) located, for illustrative purposes, at the 6:00 position on the circle. Note that the data acquisition function and the data processing function may be located at the same physical site or may be dispersed among different sites or may be stored in the cloud (i.e., on a data repository being operated by a computing device, such as a server, available over a communications network).

As indicated above, the data acquisition system (20) is capable of converting the current response N of the customer into an appropriately indexed, DQL-compatible data format (25) for presentation to the data processing system (30). This growing cumulative file of customer queries, responses, prompts, transfers, etc., constitutes only a small part of the description of the "customer journey" in a form denoted as an "event sequence index" or ESI. The data processor (30) is capable of receiving the data representing the most recent transactional step N of the customer's input to data acquisition sub-system (20), appending that data to a cumulative ESI data file of N−1 previous steps and of performing a sequence of operational steps using that cumulative data. As below, the extensive strings of DQL-searchable data corresponding to the ESI of a customer journey may be represented in a database, such as a relational database, that is "non-normalized," meaning that different sub-strings of data are in a form that can be accessed at will for deeper analysis by pattern-matching, without extensive and time-consuming searching for disconnected blocks of data to locate various types of activity patterns. In a certain sense this approach makes use of the fractal-like property of self-similarity and allows searching using a recursive algorithm that substantially increases the rapidity of the process. Although described within the context of a relational database, alternative database and data structures may be utilized, as well.

Data processor (30) subjects the current version of the customer experience to analysis (35) using insights derived by "agents" from previous customer experiences. These insights may be stored as patterns of data previously determined to be predictive of certain outcomes of a customer experience. Based on that analysis (described more fully below), the "company" (organization) may take a short-term action (40) to address the current state of the presently ongoing customer experience and, in addition, uses this analysis to implement long-term changes (as discussed in the objects, above) to improve the entire customer service process. As a result of that longer-term action (45) the customer's experience (15) may be improved both objectively and subjectively in the immediate sense and the company's customers as a whole benefit in the long-term sense. In addition, the customer service system improves customer service to improve customer service for the organization.

Referring now to FIG. 2, there is shown schematically the system of FIG. 1, where the component parts and their operations are illustrated in greater detail and specificity. Customer (100) is now shown engaging in a customer experience through any of a landline phone-based channel, a mobile communications channel, or a web-based channel. These channels are all illustrative, and merely proxies for any organizationally-provided channel, such as an in-store channel or the like. Each channel may, of course, have available the proper methods of converting the events along an experience within that type of channel into the required data format.

The customer is here depicted as having a complaint that is to be resolved resolution and, to achieve that end, the customer engages with the company. The data acquisition sub-system ((20) in FIG. 1) is now shown (200) as comprising servers, storage systems and ETL (Extract, Transform, Load) software, the ETL being required to transform data from one form to another, the entire combination being capable of finally transmitting an indexed data string (compatible with DQL) to the data processing subsystem (300). The data processing subsystem ((30) in FIG. 1) is now shown as the data processing subsystem (300) as comprising a central processing unit (CPU) (310), a parallel memory (320), a system for long term data storage (330) and sufficient software or hardware (340) to implement various analysis algorithms.

Central processor portion (310) includes, for example, a digitized, electronically (i.e., tangibly) encoded algorithm that updates a data file representing the current state of the event sequence index, ESI. Software/hardware (340) is further operationally capable of comparing, using a DQL pattern-matching algorithm such as, but not limited to, a non-deterministic finite automaton (NDFA) such as RegEx, or the like, a portion of the current event sequence index file with a multiplicity of signature event sequence indexes stored in long term memory portion (330) as a signature file.

Depending on the results of the pattern matching process, and whether or not a match with a signature has been found, CPU device (310) and software/hardware (340) generate a notification to a company-specific "action/response" module (400), which may take immediate remedial action during the actual customer experience and may generally take a long-term action ("feedback") by modifying the "present" customer service process through improved agent training, improved sales-staff training, product improvements, and web-design.

The action/response module (400) is capable, in real time, of generating any of a number of pre-programmed responses to the customer based on the analysis contained in the data processing sub-system (300). For example, if no signature match has been found, the journey is still within predictably acceptable bounds and is allowed to continue. A prompt to the customer for the N+1 response may therefore be made. Further by way of example, the notification from the action module (400) may trigger a prompt that a transfer of the customer to a "customer service representative" may be made and the customer should await the transfer, or it may request the customer to enter some additional information using the IVR capability. The precise content of the instructions from the action/response module are dependent on the nature of the organization, the services that the customer is seeking and the current position in the journey. However, if a signature match has been found, the nature of the signature with which the match has been made may determine a specific interventional response to the customer in an effort to redirect the journey in a manner in an attempt to avoid the unsatisfactory results associated with the particular signature to which a match has been made. The fact that the match has occurred and a resulting action required to redirect the journey has been determined is then sent to the action module and the customer is instructed in accordance with a new set of prompts.

It is noted that each signature in the signature file is associated with a particular type of unsatisfactory outcome, an "anomaly." It is the task of the organization to provide remedies associated with each signature based on either a statistical or a deterministic analysis of unsatisfactory and satisfactory customer journeys. At the least, the most common set of steps leading to a complaint or a churn could be determined and used as a first order indication of impending difficulties in the journey. It is also worth noting that much progress has been made in "machine learning," or "predictive modeling," wherein algorithms search large amounts of data or "big data" to prove or disprove a hypothesis and gradually improve the search process as the hypothesis is either proved or disproved.

BRIEF DESCRIPTION OF THE DRAWINGS

The objects, features, and advantages of the present disclosure are understood within the context of the Detailed Description as set forth below. The Detailed Description is understood within the context of the accompanying figures, wherein.

DETAILED DESCRIPTION

Figure 1:
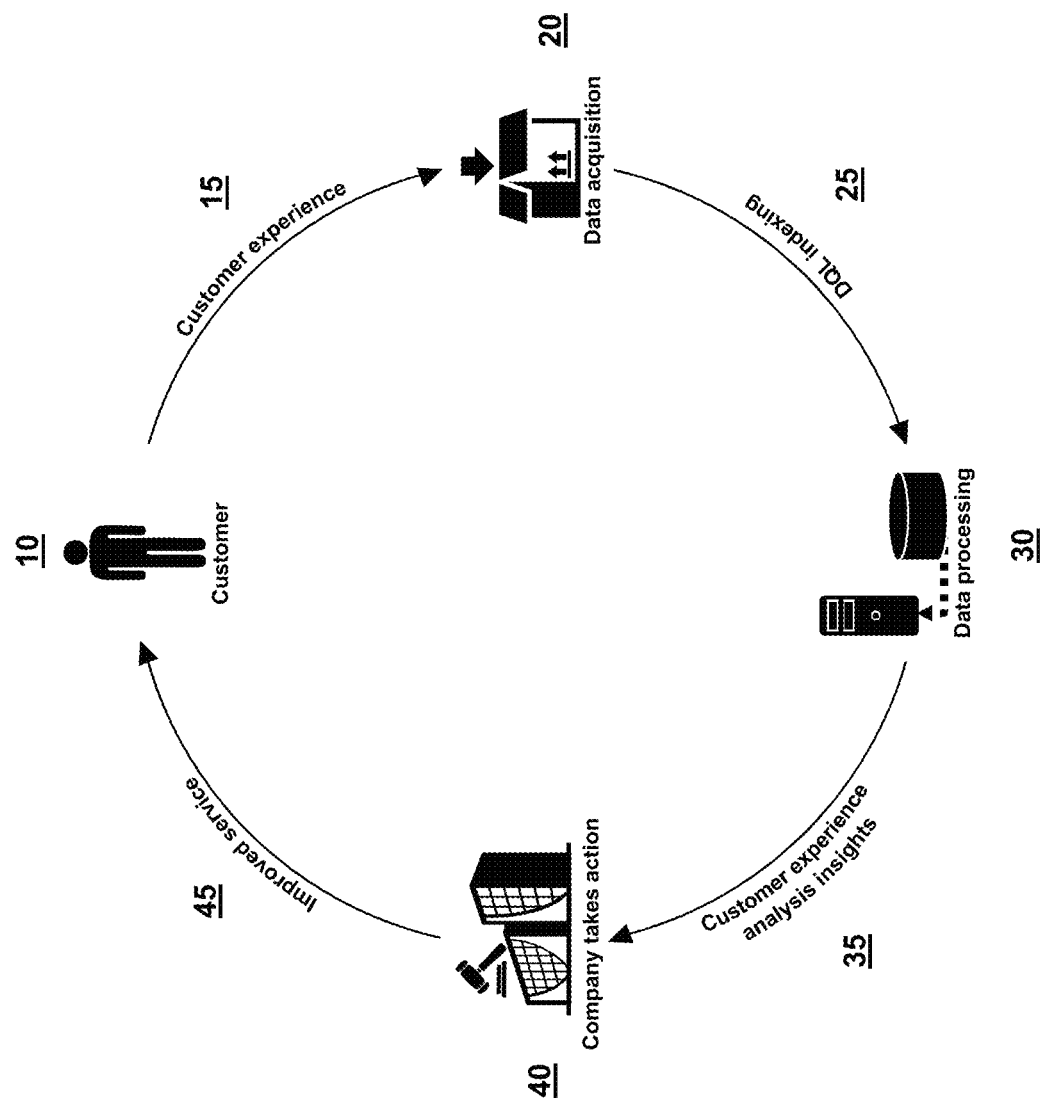
FIG. 1 is a schematic drawing illustrating components of the presently disclosed system and an exemplary process through which the is utilized; a customer is shown currently interacting with an organization through an appropriate channel.

The present disclosure provides a computer-implemented method and a system through which that method is implemented, by which a customer experience, between a customer and an organization (also denoted a "company"), is created, evaluated, categorized and used to provide feedback to improve the organization by improving the level of customer satisfaction when dealing with the organization. The improvement may result from the discovery and correction of underlying problems (customer-specific or generic) within the organization itself, so that there are no or limited further repetitions of the conditions requiring the present engagement between the customer and the organization. Alternatively, there may be an improvement in the methods by which customers interact with the organization, i.e., problems in communication. If the customer experience is currently ongoing, in a further aspect of the disclosure the experience may be optimized in real time by means of interventions based on the analyses of previous unsuccessful (or successful) customer experiences.

In a further aspect of the disclosure, the customer experience is created as a cumulative data set of time-stamped events that can be analyzed using a pattern-matching process employing DQL (Distributed Query Language) to efficiently search for specific patterns (descriptions of time ordered or un-ordered sequences of events separated in time) embedded in the data set. To implement this process, the customer experience is organized into a cumulative data-set called the "journey," which can be visualized as a linked, directed graph. In this aspect, the journey itself is then organized into an "event sequence index," (ESI), by arranging the data into a time-stamped indexed form that is organized by "channel" and events that occur sequentially along the channel. Here, a channel refers to a particular mode of interaction between the customer and the organization by whose use the customer and the organization can engage in data and information exchange as the customer attempts to achieve some end. In this notational data structure, a purchase made in a retail store, for example, would be a part of store-channel data, a complaint or request entered by telephone, would be associated with a telemetry channel, or the like.

Within each labeled channel in the event sequence index, a further sequence of time-stamped events might occur, which would be indicated as occurring along the labeled channel in a temporal sequence and illustrated graphically as a linked directed graph. This form of cumulative data organization, expressed in a DQL-searchable format, results in a "pre-joined" data structure that facilitates all subsequent operations on the data by simplifying access to specific groups or patterns of data representing particular sets of connected activities. By being "pre-joined," it is meant that the multiplicity of possible distinguishable actions occurring along a journey are concatenated in such a way that portions of the journey can be searched for and matched for patterns of interest in an quick and efficient manner.

The structural formation of these data groupings enables the system to make rapid and efficient comparisons, for example by means of a pattern matching process, such as a NDFA (Non-Deterministic Finite Automaton) such as RegEx or RegExOne applied in a recursive mode between portions of the completed or ongoing activities that leverages the essentially self-similar structure of the data string. The pattern matching is made against previously stored sets of "signatures," representing portions of other journeys (other ESI's) made by other customers that have been identified as having developed in some unsatisfactory or otherwise "anomalous" manner (including highly satisfactory). These signature portions have been analyzed by agents of the organization and are considered predictive of future journey outcomes.

Still further, the ESI can be used to visualize the journey as a linear linked directed graph (also possibly referred to as a "sparse-tree" representation) with branches corresponding to each channel pursued by the customer. Further, a complete time-stamped and time-ordered chain of events occurs along each channel. This form of visualization, which is ultimately expressed in a DQL-searchable form, greatly facilitates the further analysis of the event sequence index which, in turn, enables the real-time ability of intervention in an ongoing customer experience.

Figure 3:
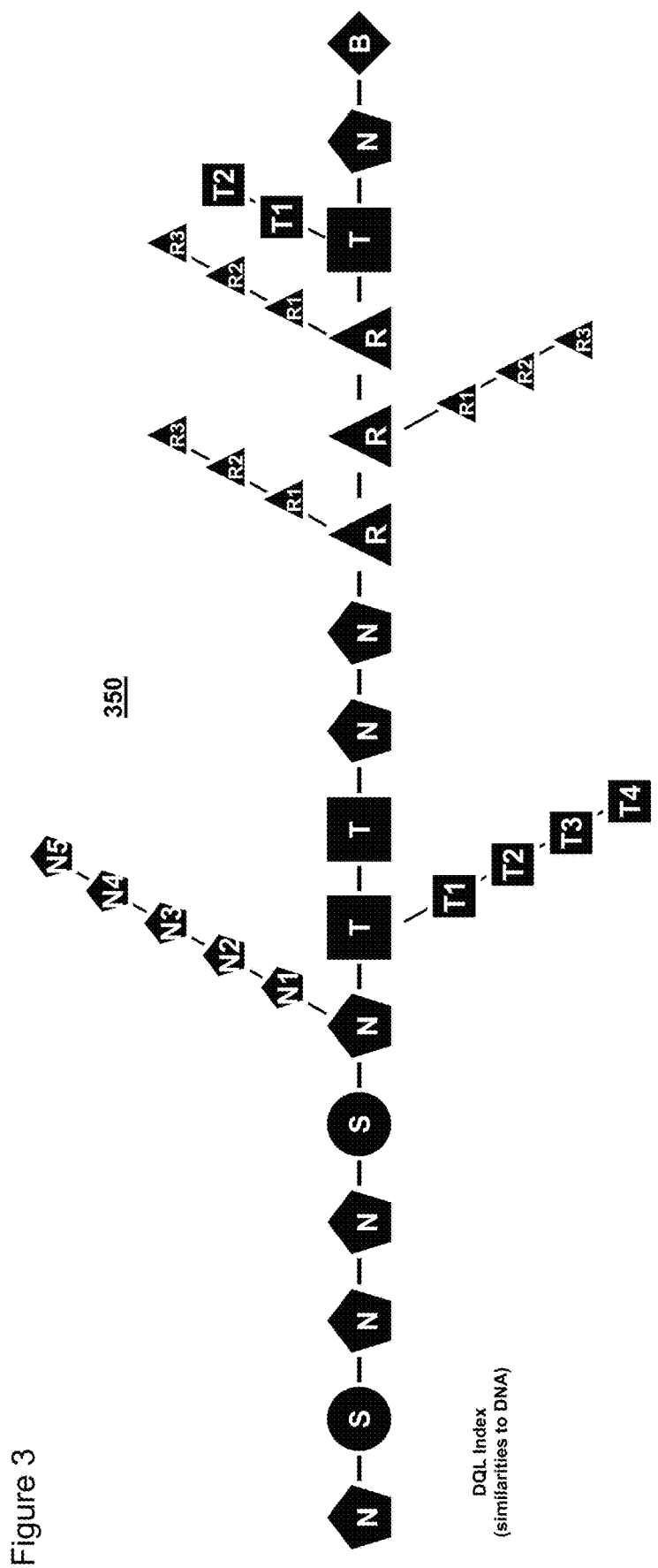
FIG. 3 is a schematic diagram illustrating a linked, directed graph representing an exemplary multi-channel completed customer experience.

In another aspect of the disclosure, the succession of channel sub-graphs extending out from the linked directed graph (as shown in FIG. 3) and the time ordered sequence of events occurring along the channel sub-graphs are searchable using DQL, when the graph is organized as a compressed data structure, where each of the multiplicity of events in the sequence are identified by a descriptive code symbol, summarizing all relevant information that uniquely characterizes the event. The code associated with each of the journey events may include, but not be limited to, the customer identification, the channel being followed, the types of transactional events encountered along the channel including prompts to the customer and responses by the customer to the prompts and actions taken by the organization as a result of the customer responses.

The linked directed graph and its representation as a DQL-searchable string of data corresponding to the individual events along graph, allows the application of a pattern matching process, such as that used in pattern matching by a non-deterministic finite automaton (NDFA) system. The "RegEx" (regular expression system) is a form of NDFA pattern matching system that is appropriate and may be applied. Two examples of this process are described herein below. This pattern-matching algorithm can be applied recursively to the ESI or, more specifically, its data-string representation and, through the use of the recursive features supported by the algorithm, the patterns characterizing particular sub-graphs, such as particular event strings extending along channels extending from the graph can be searched-for recursively and identified with speed and accuracy.

In yet another aspect of the disclosure, portions of previously obtained DQL-analyzed structures from other customer journeys may be identified, stored, searched for and retrieved for comparison with portions of ongoing customer experiences and used to optimize an ongoing customer experience in real time (i.e., while it is occurring). These sections of previously characterized patterns are termed "signatures," and, their presence is typically considered predictive of unsatisfactory outcomes of journeys, although the inclusion of satisfactory journeys is within the capability of the method. These signature patterns embedded in previous terminated journeys can be analyzed by agents of the organization and sorted according to how and why their outcomes have been unsatisfactory. The signature patterns can then be matched using DQL enabled search routines to portions of ongoing or completed customer journeys to discover similar patterns embedded in a new, yet ongoing customer journey. If such a match to a portion of an ongoing or newly completed journey between a customer and an organization is discovered, the match can be considered as (statistically or causally/deterministically) predictive of the ongoing journey being successful or unsuccessful or of the newly completed journey as having been successful or unsuccessful. In this aspect of the current disclosure, the system and method is both predictive and actionable in real-time and capable of providing feedback to the organization for improving its future customer relationships. As previously described, one or more tools in the areas of predictive modeling and machine learning may be utilized to further support the process of validating relationships between signature patterns and outcomes.

Referring now to schematic FIG. 3, there is shown a series of engagements (events) (350) between a customer and the organization that, taken together, form the basis for an ongoing customer experience. The linked directed graph shown is ultimately programmed into a DQL-searchable format (see examples 1 and 2 below for similar event series). The black shapes labeled N, S, T, etc., represent different channels, the S indicating a sale at a store (for example), the R indicating a telephone call-in channel that engaged an IVR (interactive voice response), the T indicating a call-in that engaged a service representative in a succession of time-stamped events, the N indicating a Net Promoter Score evaluation by the customer. It is to be understood that there may be upwards of 30 channels available to a customer and each channel itself leads to a multiplicity of channel-related event types and each of these event-types may be characterized by information, such as name, transaction type, transaction result, etc. The illustration uses a single symbol only for ease of visualization. The numerically labeled branches emanating outward from the channels, such as R1, R2, R3, extending outward from an R-channel (a telephone call-in channel), refer to specific time-stamped sub-events occurring along that specific R-channel. The last entry in the experience is labeled B, which is meant to indicate a complaint was filed by the customer, who was obviously dissatisfied by the course of the experience.

Figure 4:
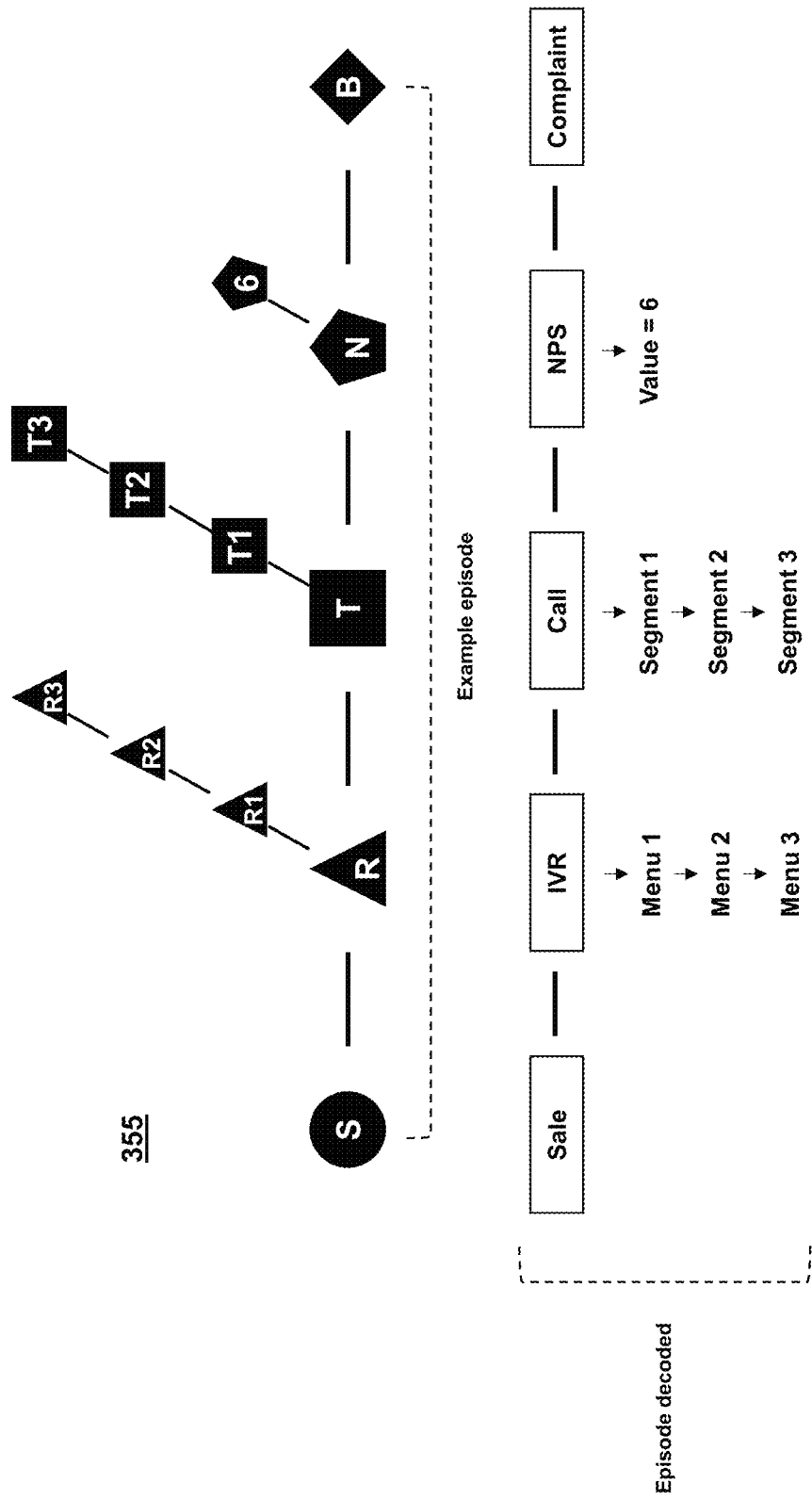
FIG. 4 is a schematic diagram showing a particular segment of the customer-experience in FIG. 3 that might be used as a signature because the customer experience terminated in a complaint.

Referring next to schematic FIG. 4, there is shown an exemplary episode (355) extracted from the longer journey in FIG. 3. This episode segment constitutes what may be considered a specific portion of a customer journey that terminated in an unsatisfactory manner as denoted by the B in a black diamond. The segment of the linked directed graph leading up to the unsuccessful termination represents an episode that began with a sale (circle containing S), and then continued on to a channel symbolized R, which is a channel that contained three IVR (Interactive Voice Response) events, R1, R2 and R3. These three events gave the customer access to three corresponding IVR menus, Menu 1, Menu 2 and Menu 3, at which the customer was asked to provide specific responses. The customer then proceeded to a call channel (a customer representative), symbolized by a T, which involved a sequence of three events, each sequence signified by a "segment," during which the customer may have interacted in a more detailed manner with the representative. Following this sequence of events, the customer was asked to provide a "Net Promoter Score," symbolized N, to evaluate the engagement. The score was a 6. Finally, the customer disengaged and lodged a complaint. Analysis of the sequence pattern led to it being considered a signature, which could then be used for future pattern matching with subsequent customer experiences.

The sequence of time-stamped events in FIG. 4 is presented in the form of a linked directed graph of nodes (events) and links (the time between events), which, for the purposes of computer analysis using DQL, may be converted an "event sequence index," (ESI). The ESI is now converted to an appropriate computer format, compatible with the application of a DQL pattern-matching routine. In this format, it is a faithful representation of the time-stamped set of all actions taken by the customer as shown in FIG. 4, indicating typical requests, prompts, responses, etc., that the customer may be asked to make during his/her engagement with the organization through the channel or channels being used in whatever degree of detail deemed necessary.

Figure 5:
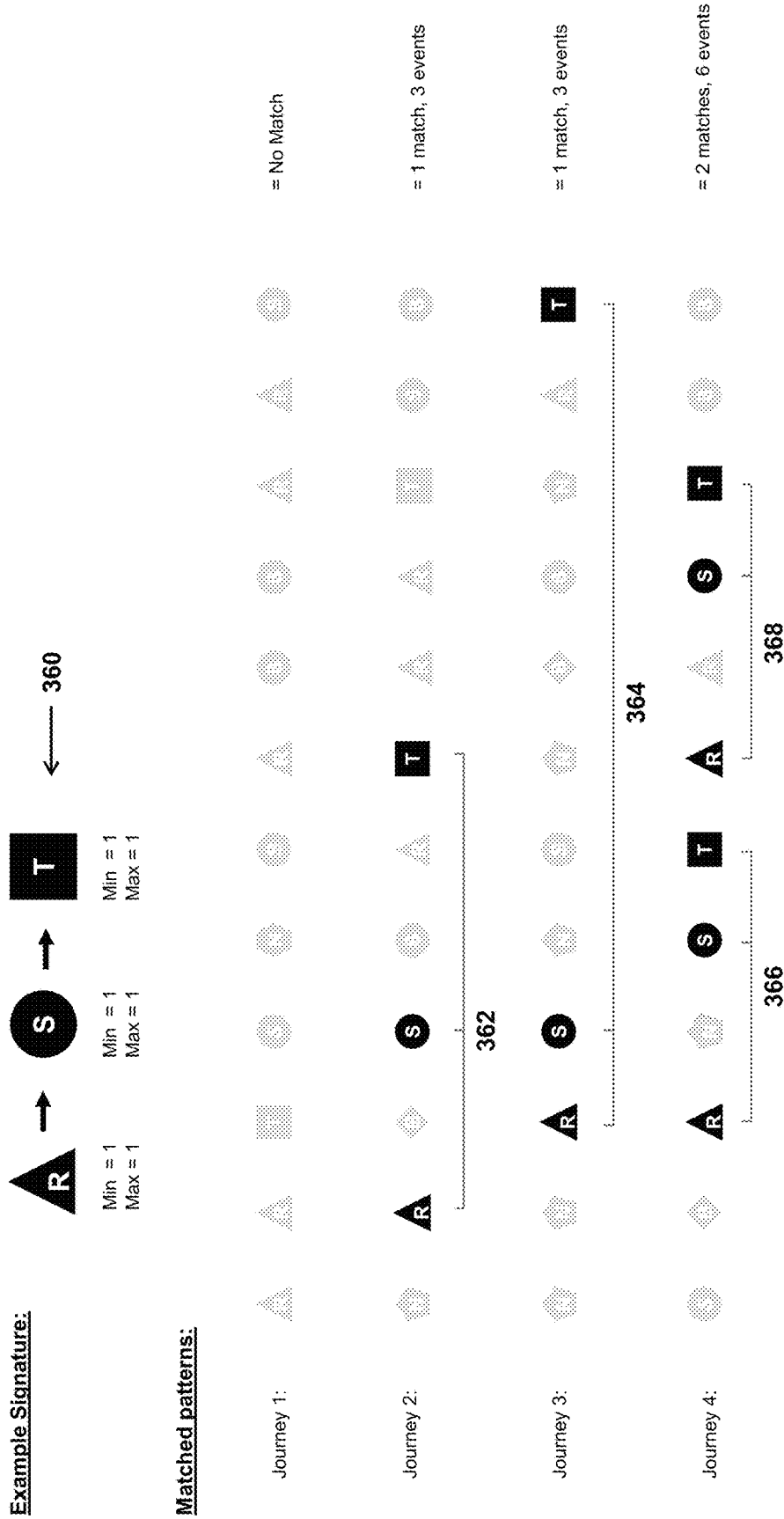
FIG. 5 is a schematic diagram illustrating the result of a pattern-matching process for a given signature applied to a sample set of customer journeys that are encoded as symbols and shapes.
Figure 6:
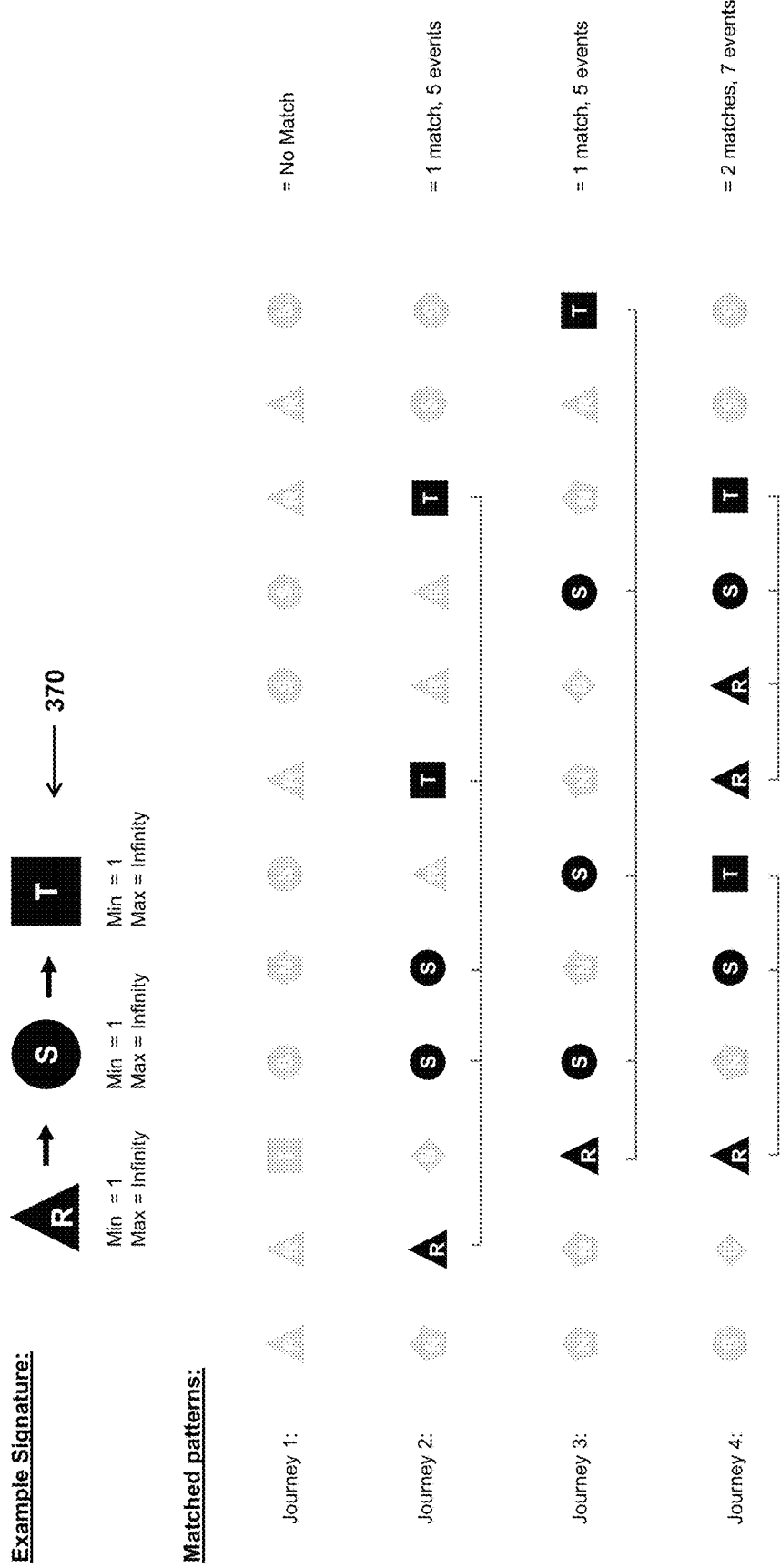
FIG. 6 is a schematic diagram showing a variation of the result of FIG. 5 when a different signature is applied to the same set of customer journeys.
Figure 7:
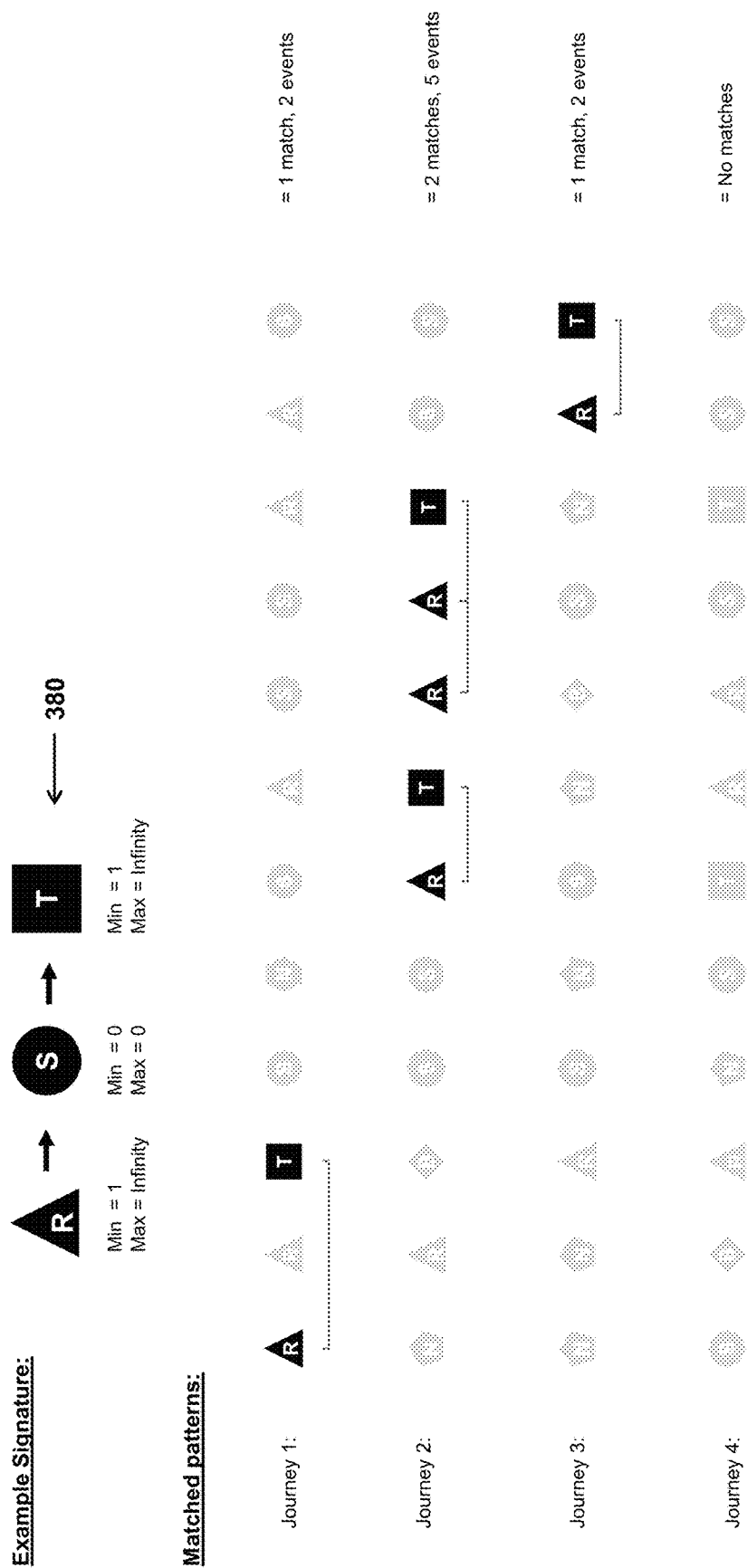
FIG. 7 is a schematic diagram showing a variation of the result of FIG. 6 when a different signature is applied to the same set of customer journeys.

Referring next to schematic FIG. 5, there is shown an example of a simple three-event ESI signature (360) being applied to a set of customer journeys to identify pattern-matches. In this example, three out of the four sample journeys contain at least one match of the given signature. The portion of the respective ESIs (journeys) that match the signature are shown linked by a connector (362, 364, 366, and 368) with individual matched events highlighted in solid black color. The matched portion of the ESI may ignore or exclude other events (shown in gray color or shaded), illustrating that a signature need not match a customer journey exactly to qualify as a match, and that sequence gaps may be tolerated depending on the clauses and predicates specified. FIG. 6 and FIG. 7 show variations in the matches and events from using different signatures (370) and (380), respectively, as the input to the pattern matching process on the same sample set of customer journeys. When a match is found, the action/response module (400 in FIG. 2) may be notified for immediate or long-term action.

Figure 2:
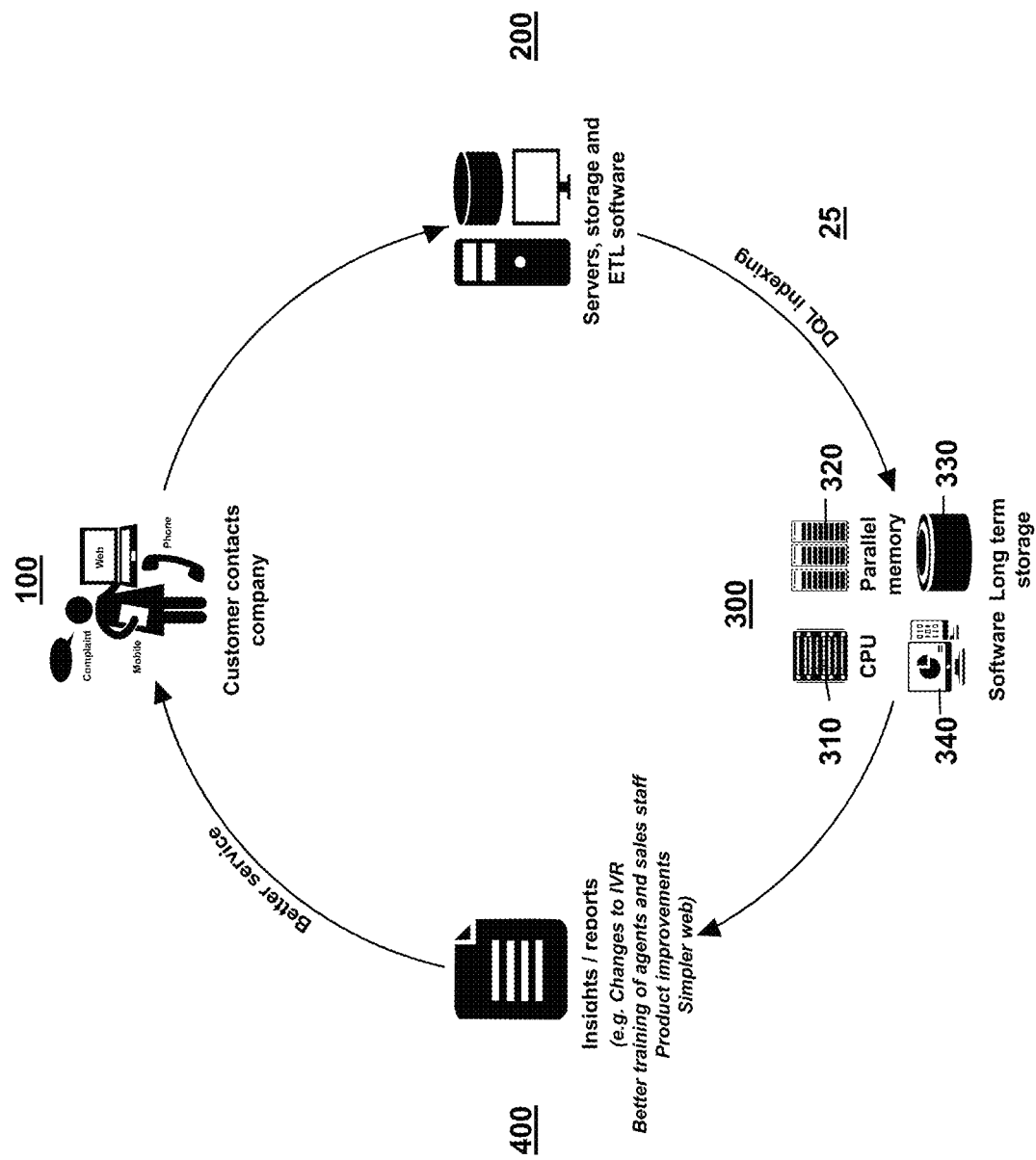
FIG. 2 is a schematic diagram illustrating in more detail the sequence of exemplary events such as shown in FIG. 1, mapping the progress of a customer experience.
Figure 8:
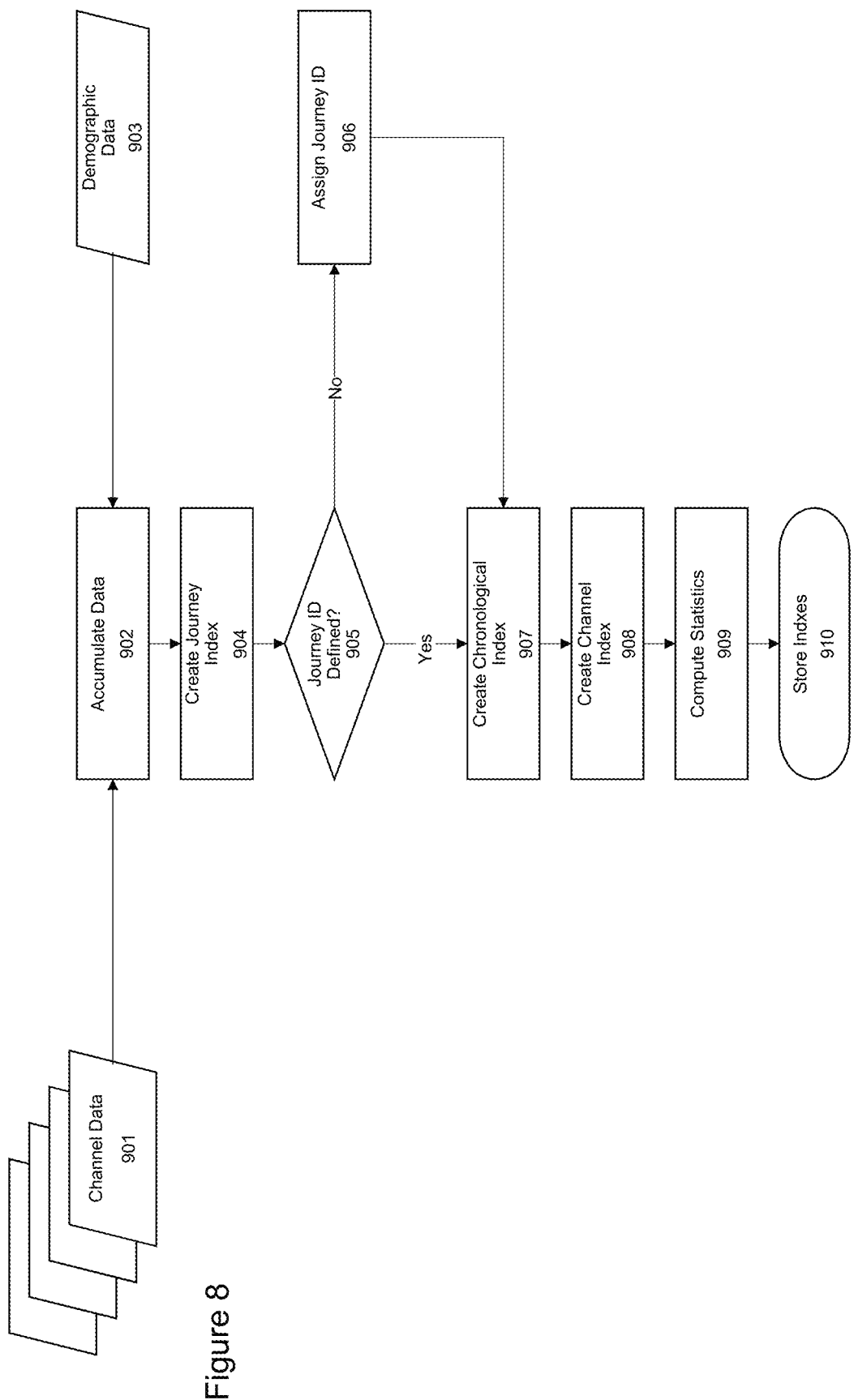
FIG. 8 is a schematic illustration of a logic-type flow chart indicating how the system and process of FIGS. 1 and 2 may be organized logically.

Referring next to schematic FIG. 8, there is shown a flow chart indicating the logical progression of steps using the system and process schematically illustrated in FIG. 1 and FIG. 2 that could have produced the linked directed graph sequence of FIG. 3 and FIG. 4. Channel data (901) is gathered from the particular channel being utilized by the customer. The data is accumulated at step (902) and may be augmented by additional data that characterizes the customer or demographic data (903). The data is combined, typically using a DQL-compatible format to form the ESI index (904).

The index is labeled and defined in steps (907)-(908). The defined indices can then be analyzed and characterized in terms of previously created statistical analysis of other ESI indices. The characterized index is stored (910) for further use as a means of improving customer relations or to provide pattern portions (signatures) for comparisons with other indices.

Figure 9:
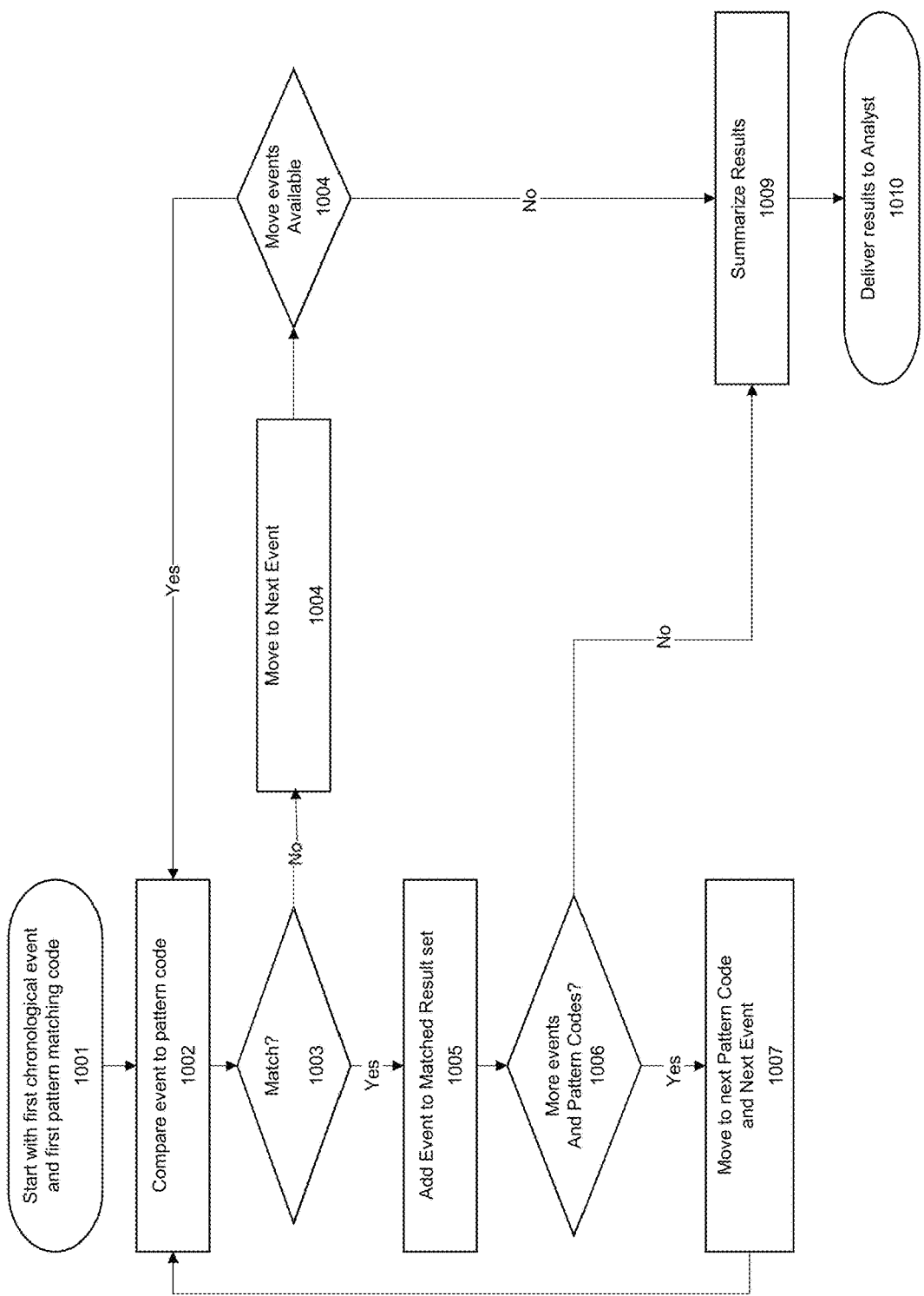
FIG. 9 is a schematic illustration of a logic-type flow chart illustrating, schematically, a pattern-matching process occurring within the process described in FIG. 5 that may be used to provide feedback to an organization customer-relations analyst.

Referring next to FIG. 9, there is shown a flow chart illustrating the logical sequence of steps by which an ongoing ESI (event sequence index) is repeatedly compared to a pre-existing set of stored patterns (i.e., "signatures") in order to obtain data and additional information/knowledge as to what types of ongoing or recently completed customer journeys are likely to have unsuccessful results. The accumulation of such pairs of current journeys and past journeys is a requirement for an organization to improve its customer relations procedures. It is recognized that the predictive nature of a match between a portion of an ongoing ESI and a member of a set of stored patterns can only be made on a statistical basis and that inevitably the signal-to-noise ratio of the pattern portions may be low as a result of the nature of customer/company prompts/responses. Thus, matched pairs of ongoing and previously accumulated pattern sequences may be analyzed statistically so that it can be "reliably" (with a given degree of confidence) argued that a pattern of such a type is predictive of an unsatisfactory (or satisfactory) outcome of a customer experience. It is further recognized that an ongoing customer experience may produce a "noisy" ESI in that time-stamped events, while encoded in the DQL encoding, may have only minimal predictive value in assessing the outcome of the journey. It is expected that techniques, such as machine learning, predictive modeling, or increasing analysis by customer-relations experts, may enable the development of noise-reduction methodologies.

Referring again to the logical flow-chart of FIG. 9, the sequence of events is indexed in chronological order beginning at step (1001). With the addition of each new event, the current ESI is again matched against stored patterns at step (1002) using a DQL-compatible pattern-matching method, such as a NDFA (Non-Deterministic Finite Automaton), such as, but not limited to, RegEx (Regular Expression) and RegExOne pattern-matching schemes, which are well known in the art, but may be applied herein to the DQL-compatible ESI because the structure inherent in DQL permits application of a recursive pattern-matching scheme.

If no match is found at step (1003), the process continues at step (1004), additional events are added to the ESI (presumably, the customer may still be engaged with the company in the journey). If a match is found at step (1005), the event set and its matching signature are added to a set of matches and, if there are no more events and signatures, the set of results (matched events and signatures) are stored for future analysis. Then, at the termination of the process, all matched journeys and stored signatures may be summarized at step (1009), analyzed statistically, and the results may be delivered to a company analyst at step (1010) as feedback for the improvement of customer relations as described in the objects. Alternatively and/or additionally, the results may be used to provide an intervention in a currently occurring customer experience based on the predictive nature of the match as made by an observing analyst or as triggered algorithmically.

As yet a further aspect of the present disclosure, determining a match between a portion of an ongoing customer experience and a signature portion of a previously completed customer experience can be predictive of the future course of the ongoing customer experience and indicate how an intervention may be used to re-direct the ongoing customer experience into a potentially more successful outcome.

Figure 10:
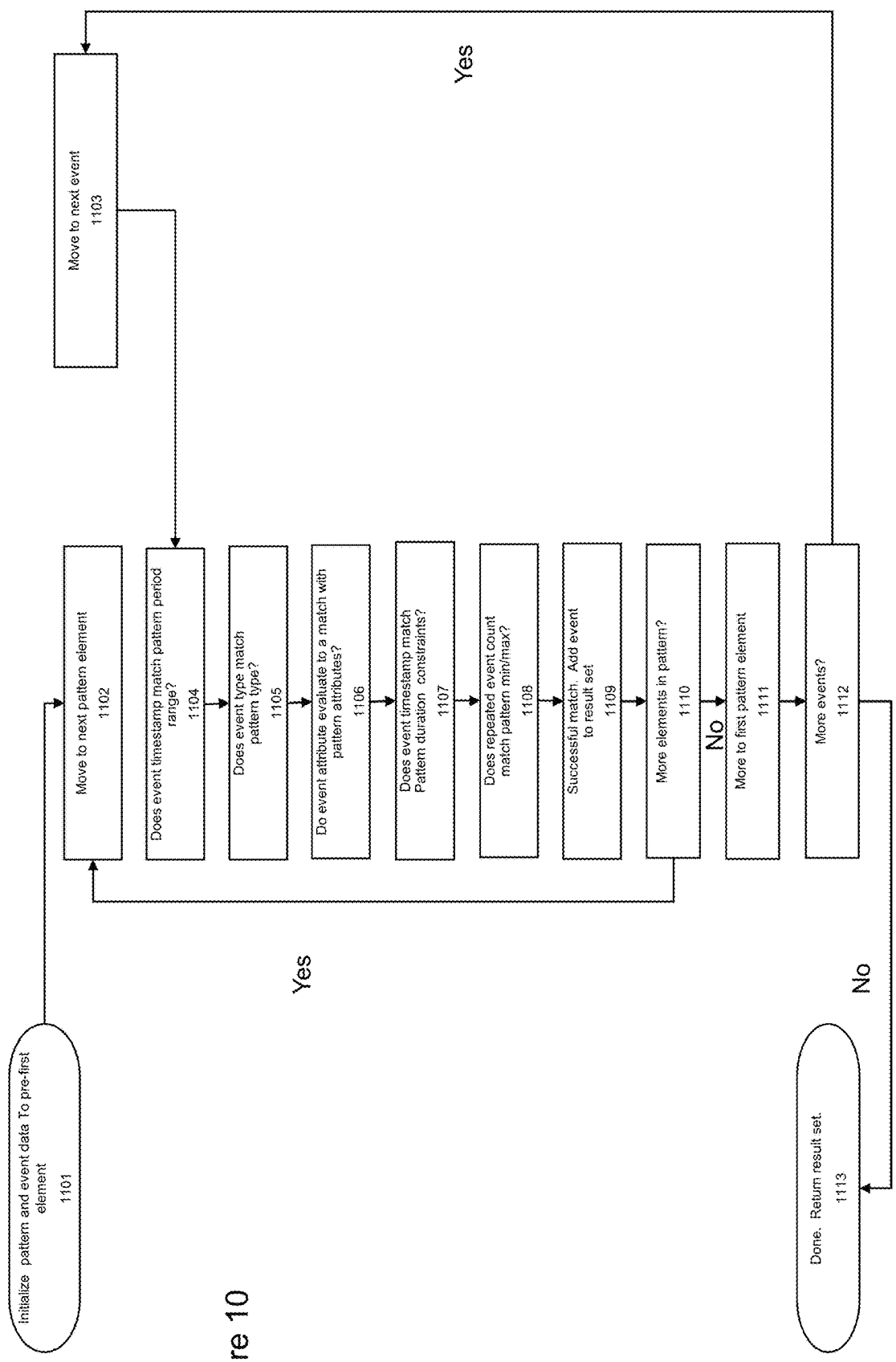
FIG. 10 is a schematic illustration of a logic-type flow chart illustrating a pattern-matching process for comparing portions of previous customer journeys (signatures) with portions of ongoing customer journeys that might be used for real-time optimization of a journey.

Referring now to schematic FIG. 10, there is shown a schematic flow-chart diagram producing a more detailed version of the algorithmic process of FIG. 9, by which portions of the exemplary customer journey of FIG. 9 may be continuously compared by a pattern-matching scheme to stored portions of previously aggregated signatures of previous customer journeys in order to ascertain whether an anomaly has occurred. The identification of an anomaly is predictive of a possibly poor outcome of a presently occurring customer journey, in which case an appropriate intervention would be suggested.

The pattern and event data are first initialized at step (1101). The current form of the DQL encoded ESI has been compared to the signature file at step (1102) and no matches have been found. A "next" event is then added to the current journey file at step (1103), which is in the form of a DQL-encoded series of time-stamped events. The updated ESI file is now subjected to a series of potential matches to elements of the signature file. The matching process is equivalent to a series of queries at steps (1104)-(1108) that are asked by matching the updated ESI to which the "next" event has now been added to signature patterns in the signature file to determine whether a match can be made. If a match is found, it is noted at step (1109) and several possibilities now exist depending on whether a real-time intervention is to occur or whether the journey will be allowed to continue, but be tagged as having matched to a previous anomalous signature.

Referring now to Example 1, there is illustrated an implementation of an illustrative search, using the pattern matching process of the present disclosure, in which a particular type of ESI is being searched. The example indicates schematically how particular events shown previously only in a linked directed graph are now specified in the JSON language or data-interchange format and implemented using DQL. Such a search process may be applied, for example, in either real-time as an ESI is in progress, or subsequent to the completion of an ESI, to see if patterns in a presently occurring customer journey have previously occurred and been analyzed or if a previously-completed ESI matches a set of criteria of interest stored in a signature file, so that the outcomes of such previously occurring and matching journeys can be analyzed and the outcome of the present journey can be predicted or better understood.

(1) In this first example, the search is directed at a set of stored ESI's in all of which a customer journey has occurred. The search is attempting to find any three-part (1)-(3) pattern in any or all of that set of journeys in which a customer has:
(1) purchased an item (e.g. a "handset") sometime between Feb. 1, 2014 and Mar. 31, 2014; then
(2) has initiated a series of RCD events in which the IVR system of the communications channel is being used, at least 25 days after the sale occurred but no more than the 35 days, and the customer must have been routed to the "BILL" pay section of the IVR system; then:
(3) a TCD (call center) event occurs.

The occurrence of the TCD event is executed in the pattern-matching schema by the equality of the same "inbound_id/dialier_id" value of both records (the current record and the signature files).

Example 1

(1) In this illustrative query, a particular pattern is being sought:
(2) A Sales event (i.e. a customer purchased something, could be a phone, a data device or additional plans) occurring between Feb. 1, 2014 and Mar. 31, 2014,
(3) followed by an IVR event (the customer went to the IVR system) and the IVR event must be at least 25 days after the Sales event, but no more than 35 days and must have been routed to the "SALE" pay section of the IVR system,
(4) followed by a CALL event linked to the IVR event in #2 above by equality of the inbound_id/dialier_id value of both records.

All the Sales events of the matched sequences may be returned.

```
{
  "name": "Sales leading to billing call",
  "journey": {
    "className": "History",
    "has": {
      "allOf": {
        "events": [
          {
            "className": "Sales",
            "eventTag": "sales",
            "minRepeatCount": 1,
            "maxRepeatCount": 1,
            "extractFields": [
              "workorder_no",
              "reps_id",
```

-continued

```
              "plan_id",
              "model_id",
              "effective_date",
              "acct_id",
              "service_id",
              "dealer_cd",
              "product_cd",
              "event_timestamp",
              "create_date"
            ],
            "periodStart": "2014-02-01 00:00:00.000",
            "periodEnd": "2014-03-31 23:59:59.000",
            "ordinal": 100
          },
          {
            "className": "IVR",
            "eventTag": "ivr",
            "attribs": {
              "type": {
                "op": "cn",
                "values": [
                  "SALE"
                ]
              },
              "routing": {
                "op": "eq",
                "values": [
                  "1234"
                ]
              }
            },
            "after": {
              "atLeast": "25 00:00:00.000",
              "atMost": "35 00:00:00.000",
              "eventTag": "sales"
            },
            "minRepeatCount": 1,
            "maxRepeatCount": 1,
            "ordinal": 200
          },
          {
            "className": "CALL",
            "eventTag": "call",
            "attribs": {
              "dialer_id": {
                "op": "eq",
                "values": [
                  "ivr::inbound_id"
                ]
              }
            },
            "minRepeatCount": 1,
            "maxRepeatCount": 1,
            "ordinal": 300
          }
        ]
      }
    }
  },
  "lod": "EVENTS",
  "includedEventTypes": "SRT",
  "resultEventTypes": "S",
  "matchOverlap": true
}
```

Referring next to Example 2, there is shown another illustrative search process, using the same pattern-matching scheme as in Example 1, in which the following characteristics of an ESI file are being searched.

(1) All sales events which are:

(2) Followed by a TCD (call center) event within 7 days of the sale and, the TCD event resulted in:

(3) One or more "Note events" occurring within a day of the call-in (a "Note event" being a post-call note made by the call center agent).

Example 2

In this illustrative query, for a search is being performed to identify:

(1) All Sales events (i.e. a customer purchased something, could be a phone, a data device or additional plans) which are, (2) followed by a CALL event (called into the call center) within 7 days of the Sale and, the CALL event resulted in, (3) one or more Note events (a post-call note made by the call-center agent) within a day of the CALL All the Note events would be returned by the query.

```
{
  "name": "Sales followed by Call and Note",
  "journey": {
    "className": "History",
    "has": {
      "allOf": {
        "events": [
          {
            "className": "Sales",
            "eventTag": "sales",
            "minRepeatCount": 1,
            "maxRepeatCount": 1,
            "ordinal": 100
          },
          {
            "className": "CALL",
            "eventTag": "call",
            "minRepeatCount": 1,
            "maxRepeatCount": -1,
            "attribs": {
              "acct_id": {
                "op": "eq",
                "values": [
                  "sales::acct_id"
                ]
              }
            },
            "after": {
              "atLeast": "0 00:00:00.000",
              "atMost": "7 00:00:00.000",
              "eventTag": "sales"
            },
            "ordinal": 200
          },
          {
            "className": "Note",
            "eventTag": "note",
            "minRepeatCount": 1,
            "maxRepeatCount": -1,
            "attribs": {
              "acct_id": {
                "op": "eq",
                "values": [
                  "call::acct_id"
                ]
              }
            },
            "after": {
              "atLeast": "0 00:00:00.000",
              "atMost": "1 00:00:00.000",
              "eventTag": "call"
            },
            "ordinal": 300
          }
        ]
      }
    },
    "lod": "EVENTS",
    "includedEventTypes": "STO",
    "resultEventTypes": "O"
  }
}
```

Examples 1 and 2 are artificially constructed and simplified. They are meant only to indicate the kinds of presently occurring or previously occurring event sequences (the patterns) that the company might deem worthy of tracking so that appropriate actions might be taken. For the purposes of computational analysis, the events are expressed as clauses, which are the constituent components making up the portions of queries, and predicates, which specify particular conditions whose presence can be verified using binary logic evaluations.

These particular event sequences may be used for post-journey analysis, to provide feedback for the improvement of future customer relations. Alternatively, the event sequences maybe used to create a real-time intervention into a presently occurring customer journey to redirect that journey along a more satisfying path.

The ability of the subject organization to identify patterns that are predictive of anomalous, satisfactory or unsatisfactory outcomes of a customer experience (ESI) depends on either a statistical analysis of many customer journeys that have led to such outcomes or, alternatively, results from a causal analysis of customer journeys by customer relations agents who are skilled in the art of such analyses and trained to recognize the appearance of potential difficulties. Correspondingly, the ability to redirect a customer experience that has the appearance of leading to an unsatisfactory outcome based on such predictive methods may also be informed by statistical analyses of previous journeys that have been satisfactory.

As is understood by a person skilled in the art, the preferred embodiments of the present disclosure are illustrative of the present disclosure rather than being limiting of the present disclosure. Revisions and modifications may be made to methods, processes, and systems, through which a customer experience may be created, stored, retrieved, evaluated, categorized and optimized, while still providing such methods, processes, and systems in accord with the present disclosure as defined by the appended claims.

What is claimed is:

1. A computer-implemented method, comprising:
   receiving, by an organization, an engagement from a customer to generate a current customer experience session;
   creating, by a computing system operating in a data repository, a unique customer-experience data file capable of storing, in a cumulative and sequential fashion, time-stamped data-points representing all events occurring during said current customer experience session and including a most recent event;
   creating, by the computer system, a customer journey file (CJF), the CJF including a current version of the customer experience data file further organized into a customer journey indexed by specified channels of interaction by the customer with the organization;
   creating, by the computer system, an event sequence index (ESI) by organizing the CJF into a time-stamped ordered chain representing the events occurring during said current customer experience session;
   representing the event sequence index (ESI) as a linked directed graph;
   storing a current state of said ESI as a linked directed graph in non-transitory memory by the computer system for application of a recursive pattern-matching process employing DQL (Distributed Query Language);
   applying, by the computer system, the pattern-matching process to the ordered chain of events in the current state of the ESI; and in response to a determination that a pattern match is found, causing, by the computer system during the current customer experience session, a pre-determined action to be performed; or if the computer system determines that no pattern match is found, continuing the current customer experience session by adding an event; and updating, by the computer system, the ESI to a new current state and repeating from the point of applying the pattern-matching process until either a pattern match is found, or the additional event is a disengagement by the customer or the organization;

wherein said pattern matching process employing DQL further comprises:

providing a signature file comprising a finite number of signatures expressed as linked directed graphs to which is applicable a pattern-matching process employing said DQL, wherein said signatures are portions of ESIs corresponding to journeys having embedded patterns associated with known outcomes;

then in a sequential manner, using a pattern-matching method, matching a selected portion of said ongoing ESI with each of said finite number of signatures in said signature file until either a match is found with a matching signature or all signatures are examined, and no match is found;

wherein if a match is found between said selected portion of said ESI and a matching signature, said match is recorded in a memory and said pre-determined action is taken;

if no match is found, said customer journey is allowed to continue.

2. The computer-implemented method of claim 1 wherein said pattern matching algorithm is a non-deterministic finite automaton using DQL.

3. The computer-implemented method of claim 2 wherein DQL is expressed in JSON (JavaScript Object Notation).

4. The computer-implemented method of claim 1 wherein event patterns in said ESI's are expressed in a form of clauses and predicates that can enable the existence of a particular sought-after pattern to be determined by binary logic.

5. The computer-implemented method of claim 1 wherein said patterns include descriptions of ordered or unordered sequences of events between said customer and said organization occurring within a channel.

6. The computer-implemented method of claim 1 wherein event patterns in said signatures are expressed in a form of clauses and predicates that can enable the existence of a particular sought-after pattern to be determined by binary logic.

7. The computer-implemented method of claim 1 wherein said pre-determined action is a call for the intervention by a customer service representative.

8. The computer-implemented method of claim 1 wherein said pre-determined action includes the storage of said current ESI and said matching signature together with a recommendation for future analysis.

9. The computer-implemented method of claim 1 wherein said pre-determined action is determined by the predictive nature of the matching signatures and said response is made during the progress of the customer experience.

10. The computer-implemented method of claim 2 wherein said pre- determined action comprises feedback to customer-relations agents for purposes of improving further outcomes of customer journeys.

11. A computer-implemented method for creating a signature file comprising:

providing a multiplicity of customer journeys, wherein each customer journey has been determined to have an anomalous outcome;

creating an ESI (event sequence index) corresponding to each said customer journey;

determining a portion of each said ESI determined to be predictive of said anomalous outcome;

extracting said portion as a signature, wherein said signature comprises portions of ESIs corresponding to journeys having embedded patterns associated with known outcomes; and labeling said ESI with said signature and storing said signature in said signature file.

12. The computer-implemented method of claim 11 wherein said portion represents the most common set of journey steps found by either statistical or causal analysis to lead to said anomalous outcome.

13. A computer-implemented system for optimizing a customer experience, comprising:

a customer experience data file associated with a customer; a customer journey file storing a current version of said customer experience data file expressed as a customer journey in ESI (event sequence index) format;

a signature file;

a channel through which a current customer experience session between said customer and an organization being engaged by said customer is being currently created and maintained in a retrievable memory, said channel being capable of prompting said customer to submit a response and said customer being capable of responding to said prompt in the form of a current instruction;

an I/O (Input/Output) device for activating said channel, wherein the input (I) portion receives said current instruction from said customer and the output (O) portion creates a cumulative data file including all information contained in said current instruction and stores said data file in said retrievable memory;

wherein said cumulative data file is expressed as an ESI in linked directed graph form, formatted to be consistent with an analysis by a non-deterministic finite automaton pattern-matching process employing DQL;

a CPU (Central Processing Unit) device including a memory portion (MP) and a central processing portion (CPP), wherein said memory portion (MP) receives said cumulative data file and wherein said CPP performs said analysis by said non-deterministic finite automaton pattern-matching process implemented in DQL to determine whether a match exists between said ESI and signatures in a signature file stored in said memory portion and, if a match is found, sends results of said algorithmic process to an action module (AM), wherein said AM formulates a response to said customer based on said result of said algorithmic process;

whereby said current customer experience session is either altered, terminated or allowed to proceed and the response is further used to provide feedback to the organization; and wherein said pattern-matching process employing DQL further comprises:

providing a signature file comprising a finite number of signatures expressed as linked directed graphs to which is applicable a pattern-matching process employing said DQL, wherein said signatures are portions of ESIs corresponding to journeys having embedded patterns associated with known outcomes;

then in a sequential manner, using a pattern-matching method, matching a selected portion of said ongoing ESI with each of said finite number of signatures in said signature file until either a match is found with a matching signature or all signatures are examined, and no match is found;

wherein if a match is found between said selected portion of said ESI and a matching signature, said match is recorded in a memory and said pre-determined action is taken; and if no match is found, said customer journey is allowed to continue.

14. The system of claim 13 wherein said step of matching a portion of said continuing ESI data file against signatures contained in said stored signature file is performed using a DQL-based non-deterministic finite automaton capable of performing recursive searches for matching patterns between a signature and an ESI data file.

15. The system of claim 14 wherein said signatures are portions of previously formed ESI data files corresponding to previous customer journeys that were deemed to be unsatisfactory and wherein said signatures are further deemed to be either statistically or causally predictive of an unsatisfactory customer experience.

16. The system of claim 15 wherein an unsatisfactory customer journey is represented as a terminated ESI data file wherein said termination corresponds to a customer exiting a channel without achieving a satisfactory result.

17. The system of claim 13 wherein event patterns in said signatures are expressed in a form of clauses and predicates that can enable the existence of a particular sought-after pattern to be determined by binary logic.

18. The system of claim 13 wherein said pattern matching algorithm is a non-deterministic finite automaton represented in DQL.

19. The system of claim 13 wherein DQL is expressed in JSON (JavaScript Object Notation).

20. The system of claim 13 wherein event patterns in said ESI's are expressed in a form of clauses and predicates that can enable the existence of a particular sought-after pattern to be determined by binary logic.

21. The system of claim 13 wherein said patterns include descriptions of ordered or unordered sequences of events between said customer and said organization occurring within a channel.

22. The system of claim 13 wherein said pre-determined action is a call for the intervention by a customer service representative.

23. The system of claim 13 wherein said pre-determined action includes the storage of said current ESI and said matching signature together with a recommendation for future analysis.

24. The system of claim 13 wherein said pre-determined action is determined by the predictive nature of the matching signatures and said response is made during the progress of the customer experience.

25. The system of claim 13 wherein said pre-determined action comprises feedback to customer-relations agents for purposes of improving further outcomes of customer journeys.

26. The system of claim 13 wherein said CPU is further configured to analyze the signature file either statistically or deterministically to detect underlying organizational problems that may be a common factor discovered in the signature structures.

27. The system of claim 13 wherein said CPU is further configured to analyze the signature file either statistically or deterministically to determine correlations that may exist between said signatures and subsequent customer behaviors.

* * * * *